Dec. 24, 1935.  W. D. CROWELL  2,025,272
VENTILATING APPARATUS FOR VEHICLE BODIES
Filed March 31, 1934
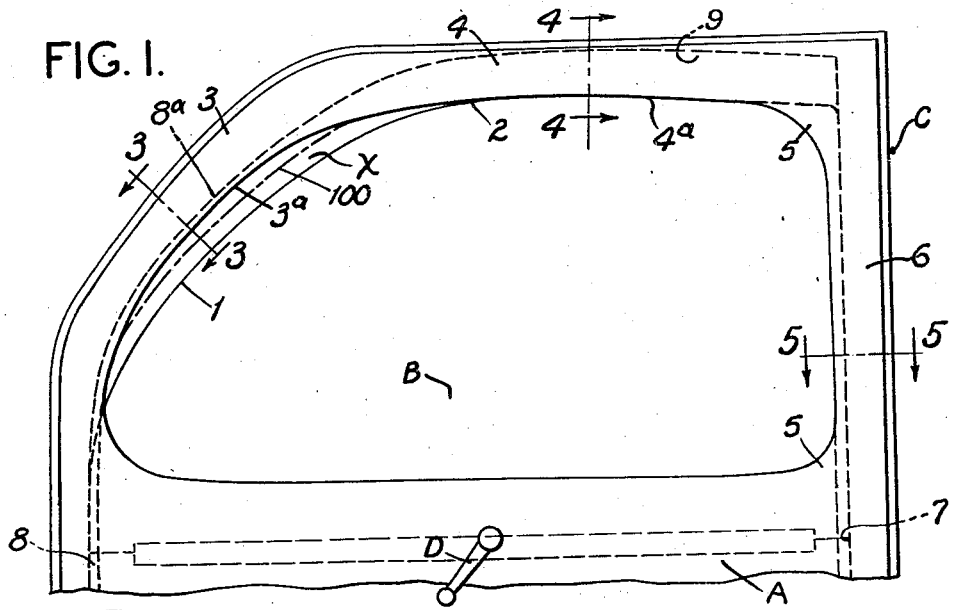
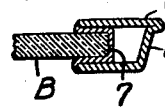
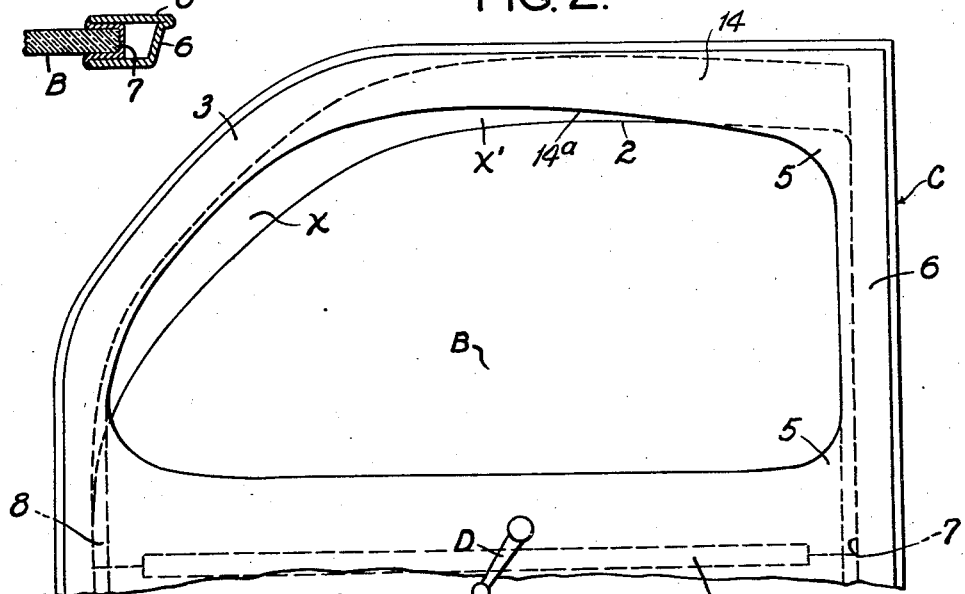
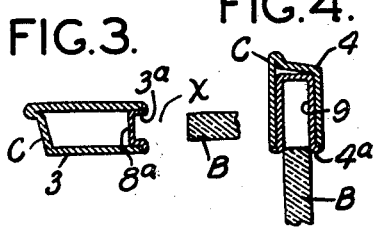
INVENTOR
WILLIAM D. CROWELL
BY Bakewell & Church
ATTORNEYS Patented Dec. 24, 1935

2,025,272

UNITED STATES PATENT OFFICE 2,025,272

VENTILATING APPARATUS FOR VEHICLE BODIES

William D. Crowell, St. Louis, Mo., assignor to Automobile Ventilation, Inc., Detroit, Mich., a corporation of Michigan Application March 31, 1934, Serial No. 718,332

14 Claims. (Cl. 296—44).

This invention relates to a ventilating apparatus for vehicle bodies of the general type described in my U. S. Patent No. 1,796,442, dated March 17, 1931, which apparatus is equipped with a vertically-movable window or side wall closure constructed so as to be capable of being set in a closed position and in an open position, and also adapted to be adjusted in a ventilating position, wherein a substantially upright or rearwardly sloping suction opening is provided at or adjacent the front edge of the window through which foul air, smoke and gases are exhausted from the interior of the vehicle body by a suction produced on said opening by external air currents which flow rearwardly over the body when the vehicle is in forward motion.

The main objects of my present invention are to increase the ventilating effect, improve the appearance and increase the range of adjustment of a ventilating apparatus of the general type described in my said prior patent.

Another object is to provide a vehicle body ventilating apparatus of the general type mentioned, in which the suction opening or ventilating opening is of such design and arrangement that the length of said opening, as well as the width of same, will be varied during some or all of the adjustment of the window to increase or decrease the circulation of air through the vehicle.

Another object is to provide a ventilating apparatus for vehicle bodies, which is of such construction that the window may be adjusted to produce practically a combined air exit and air inlet through which foul air, smoke and the like are exhausted from the body adjacent the front end of the window and through which sufficient fresh air will filter into the body at the top edge of the window to properly ventilate the vehicle, without causing annoyance or discomfiture to the occupants. Other objects and desirable features of my invention will be hereinafter pointed out.

The vehicle body or ventilating apparatus herein illustrated embodies the basic principles of the structure described in my U. S. patent previously mentioned, but it is distinguished from said structure in certain respects, as follows:

(1) It comprises a side wall window and coacting frame which are of such shape and arrangement that a minimum ventilating effect may be obtained by setting the window in an initial ventilating position wherein a substantially diagonally-disposed suction opening of relatively small dimensions is provided at the forward portion of the window, and movement of the window in a direction to increase the ventilating effect, causes the width of said opening and also the length of same to be increased. Such a suction opening or ventilating opening is desirable, in that it increases the range of adjustment of the apparatus, due to the fact that the window may be adjusted to obtain a minimum ventilating effect, in which only a relatively slight circulation of air through the vehicle is produced, and it may be adjusted by fractional movements to obtain a maximum ventilating effect, in which a relatively great circulation of air through the vehicle is produced, without liability of an objectionable quantity of air blowing into the vehicle over the top edge of the window.

(2) It comprises a side wall window whose forward portion is of such shape that the edge of same may be said to form practically a continuous line that slopes upwardly and rearwardly and merges into the top edge of the window. In general form or outline the forward portion of the window is inclined and curvilinear or substantially arc-shaped or convex-shaped and the co-acting portion of the window frame is also inclined and curvilinear or substantially arc-shaped or convex-shaped. Consequently, when the window is adjusted in its ventilating position there is produced between the front portion of the window and the window frame, a suction opening whose general shape or form is that of an arc or crescent. This imparts a pleasing appearance to the structure; it adapts it to automobile bodies of the particular design which is now the vogue; it eliminates a sharp corner or angular portion at the junction of the front edge and top edge of the window, and when the window is set in its ventilating position, there is produced a suction opening at the front end of same which is of gradually decreasing width from approximately its center towards its rear, upper end.

(3) The top edge of the window and the bottom edge of the top member of the window frame or other means that co-acts with the top edge portion of the window, may, if desired, be disposed at such an angle relatively to each other, that when the window is moved downwardly from its closed position, there will be produced a tapered space of gradually decreasing depth at the upper end of the window, whose large end merges into and forms a continuation of the suction opening at the front portion of the window. As the window is lowered more or moved farther towards the position where the maximum ventilating effect is obtained, the length of said tapered space will increase progressively as the width of the suction opening increases, but the general shape of said tapered space always remains substantially the same. When the window is set or adjusted to obtain the maximum ventilating effect, the rear end of said tapered space extends into the zone of inwardly flowing external air currents which beat against the window, but there is no liability of an objectionable quantity of air blowing into the vehicle through said tapered space, on account of the minute dimensions of the rear end of said space. However, a sufficient quantity of fresh air will filter into the vehicle through the rear end of said tapered space to ventilate the vehicle without causing annoyance to the occupants. It will thus be seen that in addition to increase the range of adjustment of the apparatus, the structure just described makes it possible for the window to be set or adjusted so as to produce practically a combined air exit and air inlet through which foul air and gases are exhausted from the vehicle at the front end of the window and sufficient fresh air is permitted to filter into the vehicle over the top edge of the window to effectively ventilate the vehicle without causing discomfiture to the occupants.

Figure 1 of the drawing is a side elevational view of my improved ventilating apparatus for vehicle bodies.

Figure 2 is a side elevational view, illustrating a slight modification of the structure shown in Figure 1.

Figures 3, 4 and 5 are sectional views, taken on the lines 3—3, 4—4 and 5—5, respectively, of Figure 1; and Figure 6 is a sectional view, illustrating how a gasket or packing may be combined with the front member of the window frame to form a tight joint between said member and the co-acting edge portion of the window when the window is in its closed position.

Similarly to the invention described in my prior patent previously mentioned, my present invention is applicable to a vertically-adjustable window mounted in a stationary portion of the side wall of a vehicle body, and it is also applicable to a vertically-adjustable window mounted in a side wall door. It may be used in vehicle bodies of the closed type, open type or convertible type. I have herein illustrated my invention embodied in a door window formed from a single piece of glass, but I wish it to be understood that the invention is applicable to a window structure in which the closure for the window opening is made up of a plurality of elements or parts that are capable of being adjusted or moved independently of each other or relatively to each other.

In the drawing, the reference character A designates a side wall door of an automobile body of the closed type, B designates a vertically-adjustable window in said door, C designates as an entirety a frame for said window formed by the upper portion of said door, and D designates an operating mechanism for raising and lowering said window and for setting or adjusting the window in its ventilating position. The window B is adapted to be set in a fully raised or closed position, so as to form a tight or substantially tight closure for the window opening; it is adapted to be set in an open position by moving it downwardly into a pocket in the lower portion of the door, and it is adapted to be set in a ventilating position, as shown in Figure 1, wherein a suction opening or ventilating opening $x$ of variable depth or width and length will be produced between the window frame C and more or less of the front edge or front edge and part of the top edge of the window, depending upon the extent of movement of the window from its initial ventilating position. The window B is herein illustrated as being formed from a single sheet of glass of such length that it will form a complete closure for the window frame, but, if desired, the closure for the window frame may be made up of a plurality of sections or parts, the front one of which consists of a window B of the kind herein described.

In the vehicle ventilating apparatus herein illustrated the window B is not provided with a sharp corner or angularly-disposed portion located at the junction of an upright front edge and horizontally-disposed top edge, as illustrated in the drawings of my prior patent previously mentioned, but instead, the front portion of the window is inclined and curvilinear or substantially arc-shaped, or substantially convex-shaped in general outline, and is provided with a substantially continuous sloping upright edge 1 that merges into the top edge 2 of the window. Said arc-shaped or convexed front portion may be changed slightly in shape or outline, so long as its general shape or form is not radically departed from, and the edge 1 of same may be made in the form of a curved line or a line that comprises a straight portion and curved portions. Preferably, the edge 1 of the forward portion of the window is inclined and curvilinear and slopes upwardly and rearwardly from a point in close proximity to the bottom edge of the window, and merges into the top edge 2 of the window at a point far enough to the rear of the extreme forward edge of the window to produce a suction opening of considerable length. The window frame C is provided at its front end with a rearwardly-sloping upright or inclined and curvilinear front member 3 whose upper end portion curves slightly and merges into the relatively deep top member or channel 4 of said frame in such a way as to form a substantially arc-shaped element that bounds or is arranged in opposed relation to the front edge and top edge of the window. Curved or segmental-shaped fillets 5 are preferably arranged at the junction of the top member 4 and rear member 6 of the window frame and also at the junction of the bottom portion of said frame and the front and rear members 3 and 6, thereof, so as to carry out the arched or curved effect produced by the merging of the rearwardly sloping front member 3 into the top member 4 of the window frame.

Any suitable means may be used to guide the window and to produce tight or substantially tight joints between the window and its frame when the window is in its closed or fully raised position. So also, any suitable means may be used to prevent objectionable quantities of air from beating into the vehicle over the top edge of the window when the window is set in ventilating position. In the apparatus illustrated in Figure 1 the window B is guided by a rear channel 7 and front channel 8 of conventional dimensions, mounted in the door. The top member of the window frame is provided with a relatively deep channel 9 that receives the top edge portion of the window when the window is in its ventilating position, shown in Figure 1, and also when the window is in its fully closed position. The front member 3 of the window frame may be constructed so that the front edge 1 of the window will either butt against the same or project only slightly into said front member when the window is closed. The important thing, so far as the front member 3 and top member 4 of the window frame are concerned, is that the inner edge 3ª of said front member be arranged substantially flush or in only slight overlapping relation with the front edge portion of the window when the window is fully closed, and that the inner edge 4ª of said top member 4 be arranged a considerable distance below the top edge 2 of the window when the window is fully close, thus providing a relatively deep header member or channel, this being for the purpose of enabling the window to be moved downwardly only a very slight degree to produce a ventilating slot or suction opening of relatively small area at the front portion of the window, and to be moved downwardly a considerable distance to produce a suction opening $x$ of relatively great area, without liability of air beating into the vehicle over the top edge of the window. In the form of my invention herein illustrated the front member 3 of the window frame is provided with a relatively shallow channel or groove 8ª for receiving the front edge portion of the window when the window is fully closed, as shown in Figure 3, said channel 8ª being of considerably less depth than the channel 9 in the top member 4 of the window frame (see Figure 4) and also of less depth than a door window guide channel of conventional dimensions, such as the rear channel 7 mounted in the rear member 6 of the window frame (see Figure 5). In Figure 6 I have illustrated a gasket 10 of rubber, felt or any other suitable material, arranged at the inner edge of the front member 3 of the window frame, so as to produce a tight joint at the edge portion of the window, which contacts or engages said gasket. While I prefer to design the apparatus so that the approximately continuous convexed edge 1 of the window contacts or substantially contacts with an opposed part of the window frame when the window is closed, it will be clear from the foregoing that this is not an essential requisite of the structure, and that it is immaterial how the front end portion of the window and the co-acting portion of the window frame are constructed, so long as they are of such design, that a relatively slight movement of the window away from its closed position, will produce a slot or opening between said co-acting portions.

To produce or obtain the minimum ventilating effect the window is moved downwardly only a very slight distance. Such initial movement of the window causes a suction opening or ventilating opening of relatively slight width to be formed between the window and its frame, said opening being of substantially arc-shape or crescent shape in general outline or form. As the window is moved downwardly farther, the width of said opening increases and the length of said opening also increases, due to the fact that more of the edge portion of the window moves out of overlapping relation with the concaved inner edge of the window frame in the zone where the upper end of the front member 3 merges into the front end of the top member 4. In order to make this clear, I have used the dot and dash line 100 in Figure 1 of the drawing to indicate an intermediate position of the window between its fully closed position and its maximum effect ventilating position, shown in full lines in said figure. By comparing said dot and dash line 100 with the full line representing the edge 1 of the convexed or arc-shaped portion of the window, it will be seen that the space between said dot and dash line 100 and the inner edge of the arc-shaped front portion of the window frame is considerably narrower and also considerably shorter than the space between the inner edge of the arc-shaped portion of the window frame and the solid line that represents the edge 1 of the window. A ventilating apparatus of the construction above described has a wide range of adjustment and may be operated so as to produce a slight circulation or a strong circulation through the vehicle. When the window is set in its initial ventilating position, the suction opening or ventilating opening is relatively narrow and produces only a suction of sufficient intensity to cause a relatively slight circulation of air through the vehicle. Fractional movements of the window from said initial ventilating position increase both the width and the length of the ventilating opening, and consequently, when the window finally reaches the position where the maximum ventilating effect is obtained, the area of the suction opening is great enough to produce a strong suction, but the width of said opening is not so great as to result in rain beating into the vehicle through the suction opening $x$ in inclement weather. In addition to the desirable feature first mentioned, a ventilating apparatus of the construction above described is of attractive appearance, and it has the added advantage of being equipped with a window which has no sharp corner or angular portion at the junction of its front edge and top edge.

In the form of my invention shown in Figure 1, the bottom edge or inner edge of the top member 4 of the window frame is disposed substantially parallel with the top edge 2 of the window. However, i. desired, the bottom edge or inner edge of the top member of the window frame and the top edge of the window, may be disposed in angular relationship, so as to further increase the range of adjustment of the apparatus and also make it possible to set the window in such a position that foul air, gases, smoke and the like will be withdrawn from the vehicle by the suction exerted on the opening at the front end of the window, and sufficient fresh air will filter into the vehicle over the top edge of the window to ventilate the vehicle, without causing annoyance or discomfiture to the occupants. In other words, if the top edge of the window slopes upwardly and rearwardly and the bottom edge or inner edge of the top member of the window frame is disposed horizontally, or if the top edge of the window is disposed horizontally and the bottom edge or inner edge of the top member of the window frame slopes downwardly and rearwardly, thus causing said edges to be out of parallel relation, the downward movement of the window into its ventilating position produces a substantially tapered space at the upper end of the window whose small end or contracted end terminates near or extends into the zone where external air currents have a tendency to flow inwardly against the window. In Figure 2 of the drawing I have illustrated a ventilating apparatus embodying the characteristics just referred to and provided with a window frame whose top member 14 has an inner edge or bottom edge 14ª that is disposed at an angle to the top edge 2 of the window. When the window B is set in its initial ventilating position, the suction opening $x$ at the front end of the window through which foul air, gases and the like are withdrawn from the vehicle, will be of approximately the area and location previously described, in the discussion of the apparatus illustrated in Figure 1. Downward movement of the window towards the position where the maximum ventilating effect is obtained causes more and more of the top edge portion 2 of the window to move out of overlapping relationship with the top member 14 of the window frame, and thus produces a tapered space $x'$ (see Figure 2) that forms a continuation of the suction opening $x$ and which diminishes gradually in depth towards the rear end of the window frame. Up to a certain degree of downward movement of the window B said tapered space $x'$ acts as a suction opening, and hence, increases the range of adjustment of the apparatus by prolonging or increasing the length of the suction opening and extending the same rearwardly a greater degree over the top edge portion of the window. When, however, the window reaches the position where the maximum ventilating effect is obtained, the rear end or contracted end of the tapered space $x'$ is in the zone of external air currents, which flow inwardly towards the window, and consequently, some of such inwardly flowing air currents find their way into the vehicle over the top edge of the window, but the dimensions of the rear end of said tapered space $x'$ are so small that the quantity of air which passes through the same will not cause annoyance to the occupants, but instead, will merely supply sufficient fresh air to the vehicle to properly ventilate the same.

In the form of my invention herein illustrated the top member of the window frame is relied upon to prevent external air currents or an objectionable quantity of external air currents from blowing into the vehicle over the top edge of the window when the window is in its ventilating position. However, as previously stated, any other suitable means such as those described in my said prior patent or the equivalent of same, may be used in place of the top member of the window frame for excluding external air currents and causing the apparatus to function properly in the general way described in my said prior patent.

Having thus described my invention, what I claim as new and desire to secure by Letters Patent is:

1. A vehicle body provided with a vertically adjustable side wall window whose front end portion comprises a substantially arc-shaped edge that merges into the top edge of the window, a frame for said window whose front member has a substantially concaved edge that merges into the top member of the frame, said edges being so proportioned and arranged with relation to each other that when the window is in ventilating position said edges are in spaced relation and form a ventilating opening whose width and length varies when the position of the window is changed, and a channel or groove in the top member of the frame for receiving the edge portion of the window, said channel or groove being of sufficient depth to permit the window to be adjusted into its ventilating position without completely withdrawing the top edge portion of the window from overlapping relationship with said top frame member.

2. In a ventilating apparatus for vehicle bodies, the combination of a vertically adjustable side wall window, a frame for said window, and coacting portions at the front end of said frame and front end of said window that form opposed marginal edges of a ventilating opening when the window is moved relatively to said frame into a ventilating position, said marginal edges being disposed in such relationship that the downward movement of the window from its initial ventilating position causes the length of said ventilating opening to be increased and extended into the zone of the top edge of the window.

3. In a ventilating apparatus for vehicle bodies, the combination of a vertically adjustable side wall window provided with a substantially convexed or arc-shaped front end portion, and a frame for said window provided at its front end with a coacting substantially arc-shaped or concaved portion, said frame being provided with a top member whose inner edge is disposed at an angle to the top edge of the window.

4. In a ventilating apparatus for vehicle bodies, the combination of a vertically adjustable side wall window provided with a substantially convexed or arc-shaped front end portion, and a frame for said window provided at its front end with a coacting substantially arc-shaped or concaved portion, the top edge of said window being disposed out of parallel relation with the inner edge of the top member of the frame.

5. In a ventilating apparatus for vehicle bodies, the combination of a vertically adjustable side wall window provided with a substantially convex shaped front end portion, and a frame for said window adapted to coact with the front end portion of the window to produce an upwardly and rearwardly sloping ventilating opening at the front end of the window, the top member of said frame and the top edge of said window being constructed to form a space at the top edge of the window that forms a continuation of said ventilating opening and which decreases in depth towards its rear end when the window is in maximum ventilating position.

6. In a vehicle body, a vertically-adjustable side wall window whose front edge slopes upwardly and rearwardly and merges into the top edge of the window, and a frame for said window provided with substantially segmental shaped fillets or curved portions at the junction of the angularly-disposed parts of the frame, the window being adapted to be moved downwardly into a ventilating position to produce a suction opening of variable length and width between the window and the inner edge of the frame, through which foul air, gases and the like are withdrawn from the vehicle by external air currents, and the top member of the frame being provided with a groove or channel of sufficient depth to insure part of the top edge portion of the window being housed in same when the window is set to produce the maximum ventilating effect.

7. In a ventilating apparatus for vehicle bodies, the combination of a vertically-adjustable side wall window provided with a substantially convexed or arc-shaped front end portion, and a frame for said window provided at its front end with a co-acting substantially arc-shaped or concaved portion, the opposed edges of said curved portions being so shaped and proportioned that a change in the position of the window when it is in ventilating position, effects a change in both the width and length of the ventilating opening formed by the co-acting edges of said curved portions.

8. In a ventilating apparatus for vehicle bodies, the combination of a vertically-adjustable side wall window provided with a substantially convexed or arc-shaped front end portion, and a frame for said window provided at its front end with a co-acting substantially arc-shaped or concaved portion, the opposed edges of said curved portions being so shaped and proportioned that when the window is in ventilating position said opposed edges are in spaced relation and co-act with each other to form a ventilating opening which diminishes in width from an intermediate portion of said opening towards the ends of same.

9. In a vehicle body, a window frame having a window opening, a window glass mounted in said frame and adapted to be raised and lowered, adjacent upright edges of said glass and frame being inclined and curvilinear and cooperating to produce therebetween a ventilating slot of variable length when said glass is adjusted downwardly in its plane, the upper edge of said window frame and the upper edge of said glass cooperating to substantially close said window opening beyond the upper terminus of the ventilating slot.

10. In a vehicle body, a window frame having a window opening, a window glass mounted in said frame and adapted to be raised and lowered, adjacent upright edges of said glass and frame being inclined and curvilinear and cooperating to produce therebetween a ventilating slot of a length to extend angularly and longitudinally of the body into the zone of the top edge of the window frame when the glass is adjusted downwardly in its plane, the top edge of said window frame providing means for blocking ingress of air over the top edge of the glass beyond the upper terminus of said ventilating slot.

11. In a vehicle body, a window frame having a window opening and a front rearwardly sloping upright side, a window glass having a curvilinear sloping upright edge cooperating with said upright side to produce a ventilating slot of variable depth and length when the window is adjusted downwardly in its plane, said glass being adjustable to extend said slot angularly into the zone of the top edge of the window, the top edge of the window frame providing means for blocking ingress of air over the top edge of the glass rearwardly of the terminus of said slot.

12. In a ventilating apparatus of the class described, a window frame having a window opening and a front rearwardly sloping upright side, a window glass having a front sloping upright edge, said edge and side embodying means cooperable to produce a ventilating slot of variable length and depth when the window glass is adjusted downwardly in its plane, said glass being adjustable to extend said slot partially into the zone of the top edge of the frame, the top edge of the window frame providing means for blocking ingress of air over the top edge of the glass rearwardly of said slot.

13. In a ventilating apparatus of the class described, a window frame having a window opening and a front rearwardly sloping curved upright side, a window glass adapted to entirely close said opening and having a front sloping upright edge, said edge and side embodying means cooperable to produce a ventilating slot of variable length and depth when the window glass is adjusted downwardly in its plane, said glass being adjustable downwardly to extend said slot partially into the zone of the top edge of the frame, and a relatively deep channel in the upper side of the frame, said frame providing means for blocking ingress of air over the top edge of the glass rearwardly of said slot.

14. In a ventilating apparatus for vehicle bodies, the combination of a vertically adjustable side wall window provided with a rearwardly sloping front upright edge portion, and a frame for said window provided at its front end with a co-acting rearwardly sloping curvilinear portion, the opposed edges of said portions being so shaped and proportioned that when the window is in ventilating position said opposed edges are in spaced relation and co-act with each other to form a ventilating opening which diminishes in width from an intermediate portion of said opening towards the upper end thereof and when said window is adjusted in its plane into maximum ventilating position said slot is extended angularly and longitudinally into the zone of the top of the frame.

WILLIAM D. CROWELL.